June 30, 1953 — M. J. QUILLINAN — 2,643,823
SLIDE RULE
Filed Nov. 24, 1950 — 2 Sheets-Sheet 1
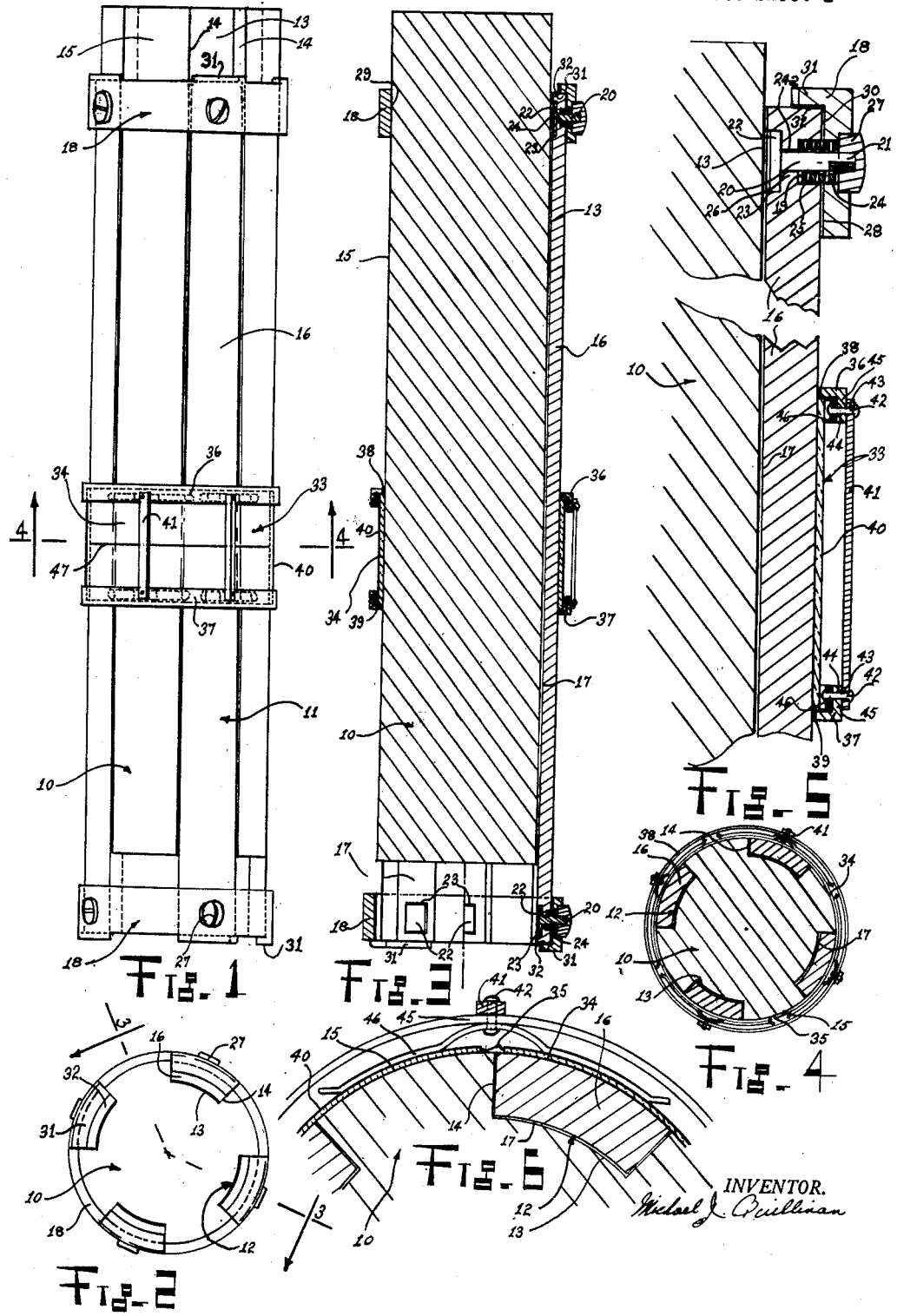
INVENTOR.
Michael J. Quillinan June 30, 1953  M. J. QUILLINAN  2,643,823
SLIDE RULE
Filed Nov. 24, 1950  2 Sheets-Sheet 2
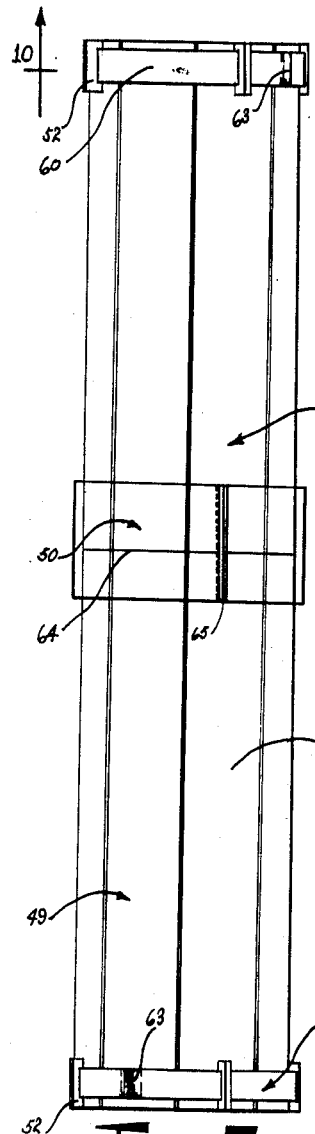
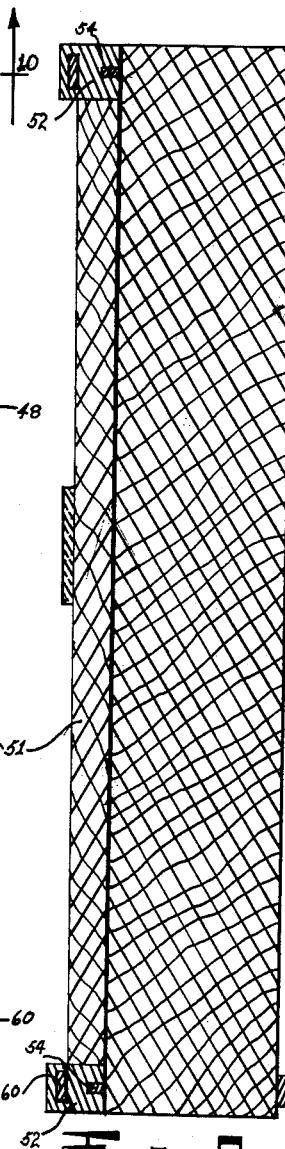
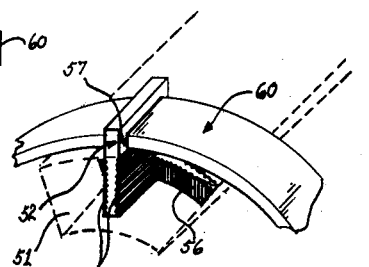
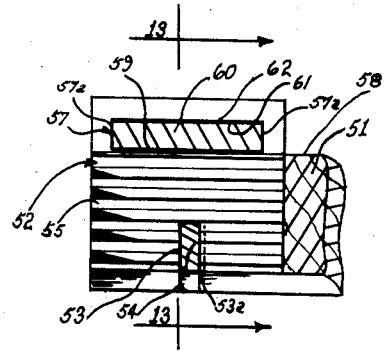
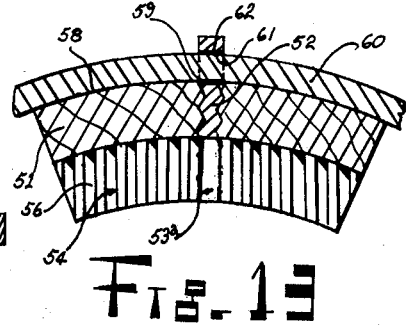
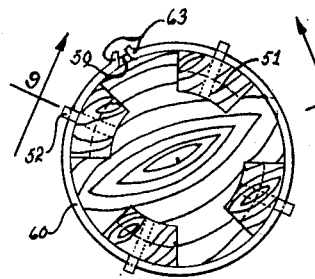
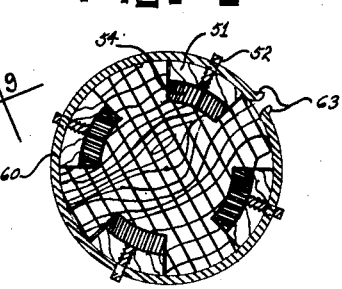
Michael J. Quillinan
INVENTOR.

Patented June 30, 1953

2,643,823

UNITED STATES PATENT OFFICE 2,643,823

SLIDE RULE

Michael J. Quillinan, Bronx, N. Y.

Application November 24, 1950, Serial No. 197,286

15 Claims. (Cl. 235—79.5)

The present invention relates to a new and improved type of slide rule, and in particular, to an improved cylindrical slide rule with a novel relationship existing between the rule's reciprocating parts.

Inasmuch as the invention is directed to a slide rule structure as distinguished from the scales or emblements that may be provided thereon, all of which are well known to those skilled in the art, the accompanying drawings, for sake of clarity, omit any indicia which might be provided on said slide rule in the solution of complex mathematical, trigonometric and logarithmic functions and problems.

While the drawing and description disclose substantially features of cylindrical slide rule construction it may be well appreciated that such a structure as is herein disclosed is applicable to slide rule modifications following the Mannheim variety. The slide rule, hereinafter generally referred to as the rule, consists of a stationary member and a sliding member reciprocating along a longitudinal axis. The sliding member consists of a rod, cylindrical on its outer face and inset with grooves along the longitudinal axis of the rod, said grooves being uniformly placed about the rod's periphery. The stationary member comprises a plurality of segments framed together at their ends, each segment being substantially matingly receivable within the inset grooves of the rod, along the longitudinal length of the stationary member. These segments unite with the sliding member in such manner that their outer surfaces combine to provide a substantially even cylindrical surface along the longitudinal length of the rule. Surrounding the rule is a tubular indexing means of a circumference corresponding to that of the rule's outer portions, which portions are graduated on their faces with suitable indicia to be compared with the hairline of the indexing means. The latter engages the outer surfaces of the rule in such fashion as to be adjustable therewith in novel means to be hereinafter described and generally referred to as automatic adjusting and compensating means. Also provided at the ends of the segments is another variety of automatic adjusting and compensating means which serves a correspondingly unique function in that it maintains the portions of the rule's stationary member yieldingly mounted in the sliding member in a manner to be hereinafter disclosed.

Of great importance to a rule of the character hereinafter disclosed are the necessary features of superlative readability and reciprocation of the rule's parts. Such features of construction have been variously attempted and hampered in their efficacy either by problems of construction, adjustability, choice of materials or economy such as leaves room for improvements in slide rule construction of the nature under consideration. In certain atmospheric conditions, changing humidity and temperature affect reciprocation in such manner that a stickiness results between the contacting surfaces of the rule's parts necessitating an adjusting of these parts to allow more fluid reciprocation by the user. Necessarily accompanying such need for adjustment are the probabilities of inaccuracy either due to improper adjusting or lack of care exercised in lining up the graduations of said rule's members with the indexing means, the rule's user requiring speed as well as accuracy.

Co-extensive with such atmospheric phenomena existing between the scaled members of the rule, is a corresponding adverse effect upon the reciprocation of the rule's indexing means. Since the indexing means with the hairline or other such mark provided thereon must be desirably in close contact with the scaled surfaces of the rule, stickiness may well result in inadequate adjustment of the indexing means by the user and careless reading of the rule's indicia when transferring from one scale to another. While it is true in this connection that adjusting means have been provided that are automatic in nature, the choice of parts and the placing thereof in the indexing means requires a high degree of control during the steps of manufacture such that adjustable spring tension will keep the hairline necessarily parallel to the graduations on the rule throughout.

Since it is also desirable to keep the reciprocating parts of the rule, namely the indexing means, the stationary member and the sliding member, in continuous co-axial relation, these problems of design and construction become more acute, when continued wear and use of the slide rule would continue to keep the rule out of adjustment and in inaccurate computing relation.

Also of considerable importance in slide rule design and construction is the need for a readable transferability of functions from one scale to another. It is to be appreciated that with increasing area for providing indicia on the scale's parts, a greater separation of graduations with respect to each other is allowable which in turn results in improved readability and accuracy by the slide rule user. While such advantages might be made available by increasing the size and length of a slide rule, it is to be appreciated that such construction provides an apparatus which is cumbersome and sensitive to the cumulative effects of atmosphere in effecting a changing of the length of the slide rule's graduated parts. The above becomes increasingly undesirable when, for considerations of economy, manufacture and choice of material, the reciprocating parts of the slide rule may be desirably made of different materials. It therefore becomes obvious that a cylindrical slide rule such as the type under consideration, provides an increased area for putting scales on the slide rule without increasing its length, thereby avoiding the problems of such latter construction. Cylindrical slide rule construction, in addition to providing these desirable features, allows an indexing means which may embrace the outer surfaces of the rule about a substantial portion, while still remaining in co-axial relation with the rule's other parts. Thus, the need for two or more indexing marks on the indexing slide, along with the possibilities of increased error in computation due to inadjustment between a plurality of such indexing marks, is avoided.

While such features of cylindrical slide rule construction are inherent in previous slide rules, the indexing means sacrifice the advantages of slide rule accuracy provided by such construction in that errors of parallax are present and must be compensated for by the reader in use of the indexing mark. Furthermore, such indexing means as have been practiced previously do not provide as sensitive and as easily reciprocated indexing marks as are to be described herein.

Frequently, in slide rule construction, the choice of material to be used either in the adjusting parts of the rule or in the major reciprocating elements of the rule, have been faced with advantages of slide rule construction which require a sacrificing of features of economy and rule practicability. It becomes desirable, for instance, to have all metallic parts of the adjusting means of the slide rule made from the same native material so that varying co-efficients of expansion will not effect a rule maladjustment. On the other hand, while such materials as wood possess a most desirable feature of stability during changing temperature conditions, the "sweating" as exists between wooden surfaces during changing humidified conditions has forced the use of metallic materials in place of economic or readily manufactured materials, i. e., wood.

Among the objects of the invention, therefore, is to provide a slide rule having improved sliding relation between the reciprocating parts of a slide rule.

Another object of the invention is to provide a rule having features of increased readability and ruggedness of character, while eliminating the effects of adverse atmospheric and temperature conditions.

Another object of the invention is to provide a slide rule, the reciprocating parts of which are substantially coaxial throughout the extremes of reciprocation.

Another object of the invention is to provide a slide rule having improved reciprocation of the scale and indexing members and allowing more ready transferability of functions from one scale to another in cylindrical slide rule construction.

Still another object of the invention is to provide a slide rule of the nature under consideration wherein errors of parallax are avoided, while allowing a substantially contiguous relationship between the surfaces of the indexing means and the rule's scaled members and ready reciprocation of these parts with respect to each other.

Still another object of the invention is to provide a rule having automatic adjusting and compensating means in its reciprocating parts.

Still another object of the invention is to provide a rule that is rugged, readily manufactured and easily assembled, allowing an economical choice of materials in heretofore impracticable slide rule construction in such combination as will hereinafter be disclosed.

It remains, therefore, to continue such features of construction in a slide rule which will eliminate all of these disadvantages hereinabove alluded to, and continue the desirable features of slide rule construction which will be more fully appreciated by referral to the accompanying drawings and disclosures, wherein:

Figure 1 is a length-wise view of the slide rule under consideration.

Figure 2 is an end view of the slide rule shown in Figure 1.

Figure 3 is a longitudinal sectional view taken along lines 3—3 in Figure 2.

Figure 4 is a sectional transverse view of the slide rule shown in Figure 1 taken along line 4.

Figure 5 is a substantially enlarged view of portions of the slide rule shown in Figure 3.

Figure 6 is an enlarged transverse sectional view of a portion of the slide rule, representing portions of said rule in a manner substantially as indicated in Figure 4.

Figure 7 is a view similar to that of Figure 1, showing a modification of the slide rule.

Figure 8 is an end view of the slide rule shown in Figure 7.

Figure 9 is a longitudinal sectional view taken along line 9—9 in Figure 8.

Figure 10 is a transverse sectional view of the slide rule taken along line 10—10 in Figure 7.

Figure 11 is a phantom view of a portion of a slide rule segment showing a modification of the slide rule's automatic adjusting and compensating means.

Figure 12 is an enlarged side view of a portion of the rule's segment taken in a plane offset from the center of the segment in slight degree so as to show the segment partially in elevation and partially in section.

Figure 13 is an enlarged transverse sectional view of the parts shown in Figure 12 taken along line 13—13.

Referring now to Figures 1 and 2, the slide rule comprises a longitudinal rod, generally shown as 10, which reciprocates within and along a stationary member, generally shown as 11. Provided on the rod or sliding member are a number of grooves, generally shown as 12, which grooves are inset from the rod's peripheral surfaces and uniformly distributed thereabout. These grooves 12 are cylindrically surfaced as at 13 and have radially extending sides 14 which extend to the outer extremes of the rod 10. These outer extremes are similarly cylindrically surfaced as at 15 so as to be substantially co-axial throughout the rod's length with the surface 13 of the grooves 12.

The stationary member 11 consists of a number of segments 16 arranged about and co-axial with the rod 10 so as to be substantially matingly receivable within grooves 12. These segments 16 are correspondingly cylindrically surfaced on their inner faces 17 so as to contact uniformly the cylindrical surfaces 13 of the rod 10 and have their sides 17 evenly engageable with the straight sides 14 of the grooves 12. Provided at the ends of the segments 16 are cylindrical frames 18 which surround the edge of the segments 16 and are connected thereto so as to place the segments 16 in a grouped relation about the rod 10.

Referring now to Figure 6 it will be seen that the depth of each of the segments 16 corresponds to the amount of inset in the rod 10 of grooves 12.

Referring now to Figures 3 and 5, it will be seen that incorporated in the frames 18 are openings 19 which surround a shank 20, threaded at one extremity 21 and having a flange 22 that is polygonally seated so as to be non-rotatable threat as at 23. The frame 18 is bored as at 24 so as to line up with bored hole 25 of segment 16 to provide a cylindrical hole wherein is seated the spring 19 which rests upon ledge or shoulder 26, surrounds shank 20 and is compressed thereon by cap 27 screwed on to the shank 20 at 21. (The segment 16 is also bored as at 24a to snugly surround shank 20 and maintain the latter in a stationary position perpendicular to the rule's axis.) It will be seen that the inner surface 28 of the frame 18 is slightly greater in diameter than either the surfaces 29 or 30 of the rod 10 and the segments 16, respectively, as they are secured in group relation on the rule. The frames 18 have flanges 31 which are radially directed inward to compress the extremities of each of the respective segments 16 of the stationary scale 11 upon the face 32.

The indexing means generally shown as 33 consists of a tubular, transparent cylinder 34 corresponding in diameter substantially to the outer diameters of both the rod 10, comprising the sliding member and the stationary member 11. The cylinder 34 is slit as at 35 along its longitudinal length for a purpose which will be hereinafter disclosed.

Collars 36 and 37 compress the cylinder 34, surrounding the latter both at its extreme end portions 38 and 39 and on its tubular outer face 40.

Connecting the collars 36 and 37 in fixed relation are a plurality of strips 41 which are riveted, as at 42 or otherwise similarly fixed in place upon the collars. These rivets 42 pass through holes 43 in the strips 41 and through holes 44 in the cylindrical flange 45 of the collars and in turn pass through holed portions provided in leaf springs 46, thereby securing the strips, collars and leaf springs together.

The leaf springs 46 are uniformly distributed about the cylindrical surface of the rod 10 and the stationary scale 11 and resiliently engage the tubular face 40 of the cylinder 34, maintaining the latter yieldingly in place around the rule's reciprocating parts.

An indexing mark or hairline 47 is provided on the inner surface of the cylinder 34 so as to be viewable therethrough.

The segments 16 and the rod 10 have graduations on their outer faces provided either by engraving, lithography printing, or other such similar means.

In operation, the stationary member 11 and the rod comprising the sliding member 10 reciprocate lengthwise along the rule's longitudinal axis in such manner that the outer cylindrical faces 15 of the rod 10 clear the inner cylindrical faces of the frame 18 when the rule's reciprocating parts are extended.

The cylindrical faces 15 of the rod 10 and the cylindrical outer faces of the segments 16 unite to present a substantially uniform cylindrical, interrupted surface about the rule's perimeter and thereby engage the inner surface and hairline 47 of the cylinder 34, thus eliminating any errors of parallax which may result.

The leaf springs 46, being uniformly disposed about the periphery of the rule's reciprocating parts, maintain the substantially resilient cylinder 34 adjustably in place about the cylindrical graduated faces of the rule.

The slot 35 allows the cylinder 34 to expand or contract and thereby adjust itself to varying expansions, sweating and undue friction that may come to exist as a result of changing atmospheric conditions or frictional surface phenomena inherent between the particular material from which the rule's reciprocating parts are made. The leaf springs 46, since they cylindrically embrace the indexing means, maintain the latter substantially co-axial with the rule. Furthermore, as the strips 41 keep the collars 36 and 37 fixedly in place against the extreme end portions 38 and 39 of the cylinder 40, any gyration due to eccentric application of force upon the slit cylinder 34, is thereby eliminated, assuring that the axis of the hairline remains co-axial with the rule and that the said hairline remains parallel to the graduated portions thereof.

The above alluded to automatic adjusting and compensating means provided on the segments 16 operate in the following manner: the spring 19 is retained between the underface of the nut 27 and the shoulder 26 of segment 16 as more clearly viewed in Figure 5. It will be seen that the distance between nut 27 and flange 22 is manually adjustable but remains substantially the same when the rule is assembled. The spring 19 imparts a tension between shoulder 26 and the cap 27, thereby maintaining the respective segments in spaced relation to the frame 18. The flange 22, by polygonally mating with the inner surface of each of the respective segments 16, prevents longitudinal displacement of one segment relative to the other since the shank 20 in being threaded into the nut 27 maintains the frame 18, the nut 27, the shank 20 and the flange 22, in fixed longitudinal relation. Such uniform displacement as is desirable is further assured by having the holed portion that is proximate to the shoulder 26 of each segment correspond substantially to the diameter of shank 20. Thus, it will be seen that each of these segments, although radially displaceable, are still maintained in uniform longitudinal arrangement thereby permitting the ready transfers of functions from one scale to another accurately while permitting more fluid reciprocation.

The combination of automatic adjusting and compensating means which groups each of the segments 16 in place within the inset grooves 12 is still further assured in effecting uniform radial displacement by the substantially corresponding arcuate surface on the face 13 of the rod 10. These latter faces also, since they are co-axial, insure that the segments 16 that are brought to bear against them, are similarly co-axial both with respect to each other and to the rod 10. The feature is important since it is necessary not only to maintain uniformity in the longitudinal placement of the segments 16 with respect to each other but also to have the stationary scale 11 as a unit reciprocate co-axially with the sliding member 10.

It will be seen, therefore, that where friction resulting from the above-alluded to phenomena results the components of the stationary member 11 yield radially against the spring pressure thereby effecting more ready reciprocation of the rule's parts and preventing any inherent or other such annular displacement of the segments 16 in their grouped relation. Such reciprocation is further augmented by the adjustability of the indexing means as heretofore described.

This principle of yielding pressure existing between the reciprocating parts of the rule, while eliminating errors of parallax may likewise be incorporated into the modification such as is illustrated in Figures 7–13. This latter modification comprises a stationary member, generally shown as 48, and a sliding member, generally shown as 49 with an indexing means generally shown as 50 provided thereon.

The stationary member 48 consists of a number of segments 51 similar to segments 16 of the previous modification. The sliding member 49 is substantially the same as rod 10 in the previous modification. The indexing means 50 illustrates a modification of the indexing means 33.

Provided at the ends of each of the segments 51 is a wedge 52 extending longitudinally a substantial distance along the segment 51. Extending transversely across each of the wedges 52 through slot 53 is a key 54 recessed as at 53a which extends substantially across the transverse dimension of each segment. Provided on the wedge 52 and the key 54 are teeth 55 and 56, respectively. The teeth 55 extend substantially in a longitudinal direction on both sides of the wedge. The teeth 56 on both sides of the key 54 extend in a direction substantially perpendicular to the plane of the teeth 55 and the wedge 52. By referral to Figures 11 and 13 it will be seen that each of these sets of teeth extend substantially through the length of both the wedge 52 and the key 54.

The wedge 52 and the key 54 are forced into place in the segments 51 providing a locked relationship between the parts. In executing this operation it may be desirable to make preliminary cuts in the segment 51 in both a longitudinal and transverse direction. The cuts would be substantially similar in width and length to the respective wedge 52 and key 54.

By a forcing operation the wedge 52 and key 55 would then be inserted in place in their respective slit portions of the segments 51 thereby cutting their own path in the insertion operation so as to be tongued or locked in place in permanent relation to the segments.

It will be seen that such a modification as is under consideration would require a material such as wood provided for the segments 51 but it may be well contemplated that a metallic material could be used having matingly receivable grooves provided in the slit portions of the segments, said grooves being over-sized or of such other dimension relative to each other to provide a correspondingly snug fit as could be practiced in a segment made of wood.

Provided in the upper portions of each of the wedges 52 is passage 57 which extends a substantial distance along the longitudinal dimension of the wedge and allows clear sight therethrough. The passage is provided with sides 57a which extend substantially perpendicular to the axis of the rule. The area of the wedge 52 which contains this passage 57 substantially clears the outer cylindrical surface 58 of each of the segments in such manner that the lowermost face 59 of passage 57 coincides substantially with the line of face 58, but is offset slightly from the latter.

A ring 60 is provided at the ends of the segments 51 and passes through each of the passages 57 provided in the wedges 52. This ring 60 is made of a substantially resilient material and has properties of springiness and elasticity such that it maintains a tension upon each of the faces 59 of the wedge's passage 57. The ring 60 is slit along its longitudinal face and is of such dimension as to be substantially smaller in inner diameter than either of the outer diameters of rod 49 or the grouped segments 51.

It will be seen that the ring 60 passes clearly through the passage 57 allowing a clear distance between the ring's outer face 61 and the upper longitudinal face 62 of the wedge 52. The slit end portions 63 of the ring are re-directed outwardly to provide an obstruction and thereby prevent sliding of the ring through the passages 57 of the wedge.

Thus, it will be noted that the ring 60 in passing through each of the wedges provided at the ends of the segments 51 groups them together resiliently in place about the rod 49 in a manner comparable to the automatic adjusting and compensating means described in the previous modification of the rule. The keys 54 maintain the wedges in place and prevent their "working out" in any longitudinal direction from the body portion of the segments 51. The sides 57a of the passage 57 maintain a snug fit with the sides 64 of the ring, thereby grouping the segments 51 in uniform longitudinal relation.

The indexing means 50 has a hairline 64 on its inner cylindrical face, is slit as at 65 and is made of a material having qualities of resiliency and elasticity to insure that the indexing means are maintained in close relation with the outer cylindrical surfaces of the rule, thereby allowing more fluid sliding relation between the graduated portions of the rule.

Thus, I have accomplished the objects of my invention, desiring a broad interpretation of the claims as distinguished from a limited one.

Having fully described the invention, I claim:

1. In a rule of the character described, stationary and sliding scales acting in combination, said stationary scale comprising a series of independently radially displaceable segments, said segments matingly contained in coaxial grooves provided on the face of said sliding scales along the length thereof, automatic adjusting and compensating means provided on each of said segments, said means maintaining said scales independently resiliently engageable with said grooves throughout the extremes of reciprocation.

2. In a rule of the character described, stationary and sliding scales acting in combination, said stationary scale comprising a series of independently radially displaceable segments, said segments contained in coaxial grooves provided on the face of said sliding scale, said grooves cambered along the length thereof, said segments evenly engageable on the camber of said grooves, automatic adjusting and compensating means provided on each of said segments maintaining a yielding contact with their respective grooved connections, each of said segments independently resiliently bearing upon said sliding scale, said segments in fixed longitudinal arrangement on said scale.

3. In a rule of the character described, stationary and sliding scales acting in combination, said sliding scale having grooves disposed thereabout along the length of said sliding scale, said stationary scale comprising a plurality of segments receivable in said grooves and coextensive therewith, an expandable ring surrounding said segments at their extremities, said ring engaging the face of said segments in tension and connected thereto.

4. In a rule of the character described, stationary and sliding scales acting in combination, longitudinal grooves provided on said sliding scale, said stationary scale comprising a plurality of segments contained in said longitudinal coaxial grooves and matingly receivable therein, an expandable ring in tension provided at the ends of said segments, said ring engaging segments on the exposed face thereof, extensions projecting upward from the face of segments at the extremities thereof, passages provided on said extensions, said passages snugly receiving said ring on the width thereof.

5. In a rule of the character described, a relatively stationary member, and a sliding member in combination, said stationary member comprising a plurality of segments connected together at their ends and slideable in a corresponding number of grooves provided in the sliding member along the axis thereof, an expandable frame provided on at least one of the ends of said segments, passages provided on said segments, said frame passing through said passages.

6. In a rule of the character described, a relatively stationary member, and a sliding member acting in combination, said stationary member comprising a plurality of segments connected together at their ends and slideable in grooves provided in the sliding member along the axis thereof, an expandable frame provided on at least one of the ends of said segments, wedges provided at the ends of each segment and passing upward therethrough clearing the face of each segment, passages provided in said wedges, said frame passing through said wedges in the passages thereon.

7. In a rule of the character described, a relatively stationary member, and a sliding member acting in combination, said stationary member comprising a plurality of segments connected together at their extremes and slideable in grooves provided in said sliding member along the axis thereof, an expandable ring provided at each end of said stationary member, passages provided on said segments along the ends thereof, said ring passing through said passages and in snug relation thereto.

8. In a rule of the character described, a relatively stationary member, and a sliding member acting in combination, said stationary member comprising a plurality of segments connected together at their extremes and slideable in grooves provided in said sliding member along the axis thereof, an expandable ring provided at each end of said stationary member, wedges inserted at the ends of each segment along the longitudinal dimension thereof, keys passing through said segments on the inner face thereof, said keys passing through said wedges substantially transversely across said segments, passages provided in said wedges along the length thereof, said ring passing through said passages and in snug relation thereto.

9. In a rule of the character described, a stationary member, and a sliding member acting in combination, said stationary member comprising a plurality of segments connected together at their extremes and slideable in grooves provided in said sliding member along the longitudinal axis thereof, an expandable ring provided at each end of said stationary member, said ring passing through passages on said segments and in snug relation thereto, said ring bearing on said segments through said passages.

10. In a rule of the character described, a stationary member, and a sliding member acting in combination, said stationary member comprising a plurality of segments connected together at their extremes and slideable in grooves provided in said sliding member along the longitudinal axis thereof, an expandable ring provided at each end of said stationary member, wedges inserted at the ends of each segment along the longitudinal dimensions thereof, keys inserted in said segments transversely thereacross and substantially perpendicular to said wedges, said keys and wedges grooved on their sides, said sides anchoring said keys and wedges to said segments, passages provided in said wedges along the length thereof at the upper extremities of said grooved sides, said ring passing through said passages and in snug relation thereto, said ring bearing on said wedges.

11. In a rule of the character described, a relatively stationary member, and a sliding member acting in combination, said stationary member comprising a plurality of segments connected together at their extremes and in grouped relation, said segments matingly receivable and slideable coaxially with said sliding member along the longitudinal axis thereof, an expandable ring provided on at least one end of said stationary scale, said ring slit and elastic, a wedge and key in combination provided on at least one of the ends of said segments, said wedge and key provided with teeth on their respective sides and inserted in the ends of said segments, said wedge slit and said key recessed to fit snugly in the slit portion of said wedge, the upper extremity of said wedge perforate to provide a passage, said passage clearing the face of its respective segment, said ring passing through and snugly fitting in said passage, the slit free end portions of slit ring radially directed, the faces of said segments presenting an even interrupted surface.

12. In a rule of the character described, relatively sliding and stationary members in combination, said sliding member grooved to receive the cylindrical faces of said stationary member, the latter comprising a corresponding plurality of segments inset in said sliding member and reciprocating coaxially therewith, said segments maintained in grouped relation at their ends by spring means, said spring means comprising a slit ring provided at each end of said stationary member, said ring expandable about said grouped segments and connected thereto by affixing means on the ends of said segments, said affixing means having a passage therethrough, said ring fitting snugly in said passage, said ring engaging the lower face of said passage.

13. In a rule of the character described, a stationary scaled member and a sliding scaled member, said stationary scaled member comprising a number of segments, frames grouping the segments together, said sliding member grooved along its length to receive the segments of said stationary member, said segments matingly receivable on the grooved faces of said sliding scale, the surfaces of said segments combining with the exposed surfaces of said sliding scale to present a generally cylindrical surface, automatic adjusting and compensating means for maintaining said segments flexibly displaceable in their grooved connections with said sliding member.

14. A rule of the class described comprising a stationary member, and a sliding member acting in combination, said stationary member slideable with respect to said sliding member, a groove provided in the sliding member along the length thereof, portions of said stationary scale matingly receivable in said groove, at least one expandable member provided on said stationary member, said expandable member surrounding said stationary and sliding members, at least one passage on said stationary member across the width thereof, said expandable member passing through said passage and bearing upon portions of said stationary member.

15. In a slide rule having a scale bearing segment and a frame, means for resiliently attaching said segment to said frame including a pressure responsive spring deposited between said segment and said frame, a pin passing through said spring from said segment to said frame, a flange on the end of said frame overlapping an end of said segment, whereby said segment is translatable along said pin while being non-rotatable with respect to said frame.

MICHAEL J. QUILLINAN.

References Cited in the file of this patent

UNITED STATES PATENTS

| Number | Name | Date |
|---|---|---|
| 249,117 | Thacher | Nov. 1, 1881 |
| 606,388 | Mack | June 28, 1898 |
| 813,485 | Coppage | Feb. 27, 1906 |
| 1,080,811 | Coldwell | Dec. 9, 1913 |
| 1,150,771 | Keuffel | Aug. 17, 1915 |
| 1,433,186 | Daemen | Oct. 24, 1922 |
| 1,600,214 | Butterfield | Sept. 21, 1926 |
| 2,478,547 | Pignone | Aug. 9, 1949 |
| 2,541,858 | Boehm | Feb. 13, 1951 |
| 2,597,523 | Quillinan | May 20, 1952 |

FOREIGN PATENTS

| Number | Country | Date |
|---|---|---|
| 492,010 | Germany | Feb. 15, 1930 |
| 494,027 | Germany | Mar. 17, 1930 |